Jan. 7, 1958   C. W. LINCOLN ET AL   2,818,711
PRIORITY VALVE
Filed Dec. 29, 1954   2 Sheets-Sheet 1
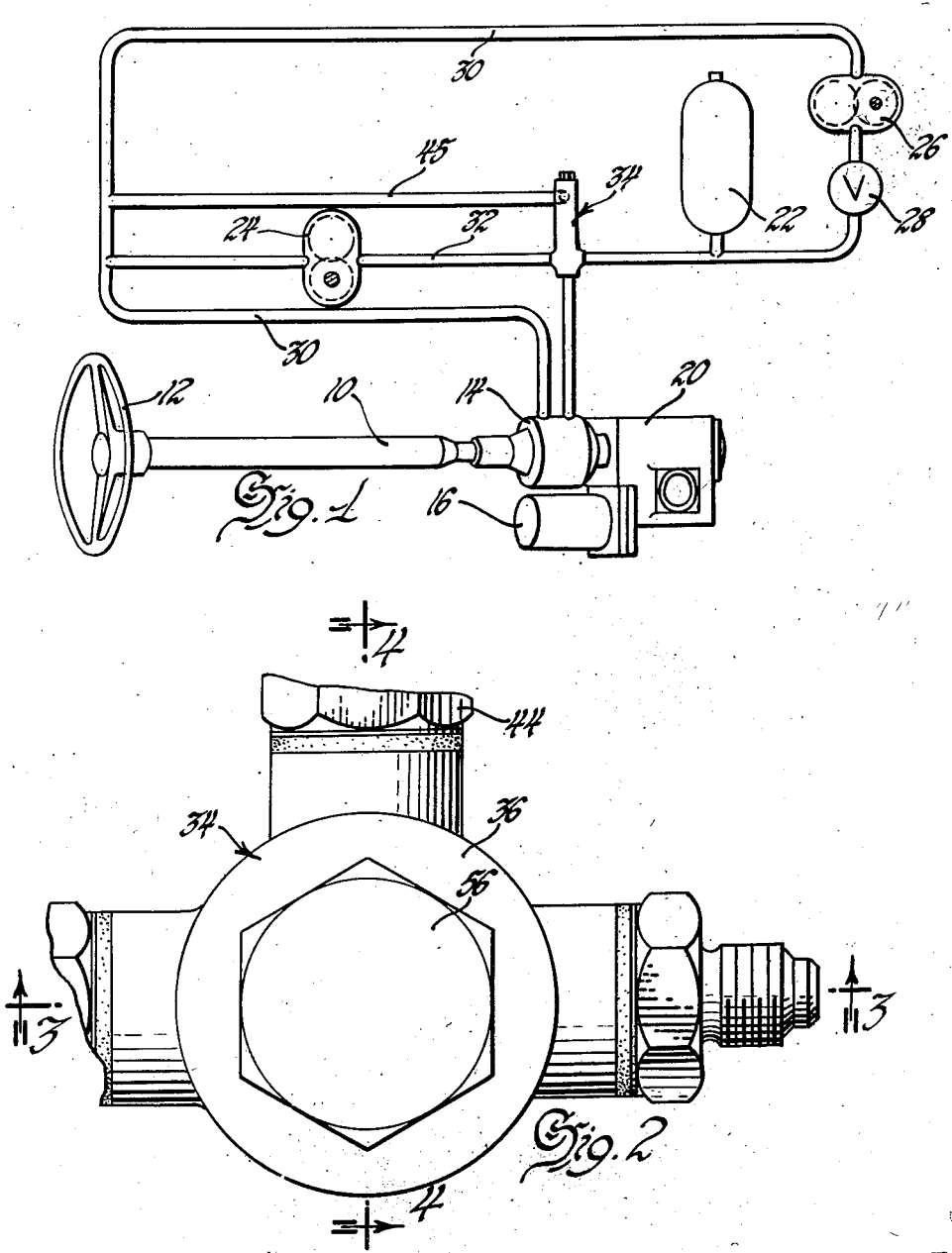
INVENTORS
Clovis W. Lincoln,
Joseph J. Verbrugge &
BY Philip B. Zeigler
ATTORNEY

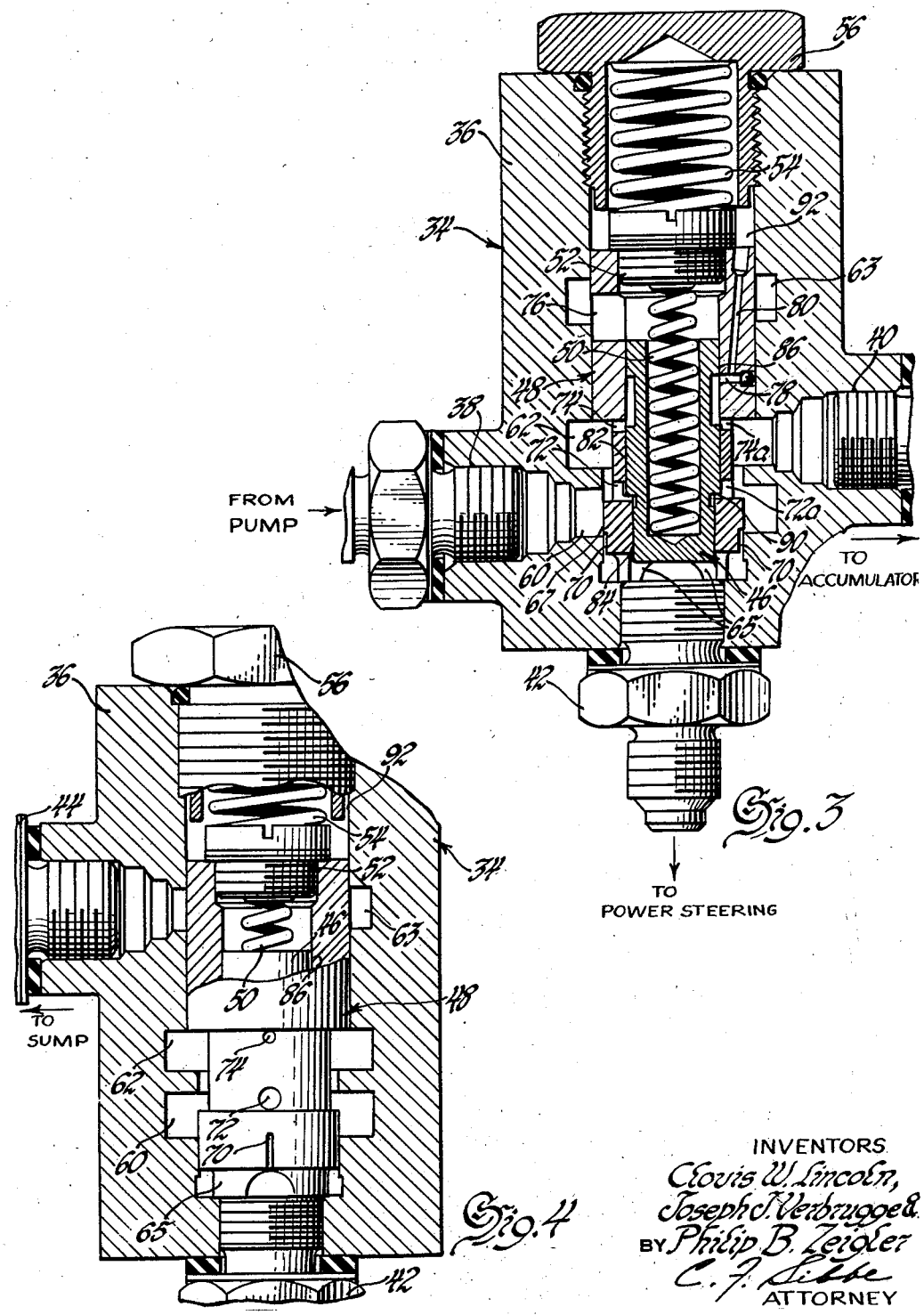

United States Patent Office 2,818,711
Patented Jan. 7, 1958

2,818,711

PRIORITY VALVE

Clovis W. Lincoln, Joseph J. Verbrugge, and Philip B. Zeigler, Saginaw, Mich., assignors to General Motors Corporation, Detroit, Mich., a corporation of Delaware Application December 29, 1954, Serial No. 478,432

7 Claims. (Cl. 60—97)

This invention relates to a valve particularly adapted for use in a fluid pressure system comprising a plurality of fluid motors, one of which must have fluid pressure available to it at all times.

Perhaps the most popular of the automotive accessories recently made generally available is power steering. In most cases, this accessory is hydraulically actuated, the system thus including a pump normally directly powered by the engine of the vehicle, an oil reservoir from which the pump draws, a suitable motor linked to a steering member, and a valve for controlling the flow of pressure fluid between the pump and motor.

It has been heretofore suggested that since there are many other mechanisms associated with an automobile capable of being operated by hydraulic means, definite benefits would follow by installing in the vehicle an accumulator of the general type used in aircraft, the idea being that the pump would then serve only to maintain the accumulator at a predetermined pressure, with all of the hydraulic motors or jacks, including the power steering motor, deriving the pressure required for their operation from the accumulator.

Because of the critical nature of the steering function, a system as above proposed is fraught with some hazard, a fact which will be appreciated when it is considered that under certain circumstances due to unusual demand on the accumulator, the pressure available for steering might not be sufficient to provide the degree of assist anticipated by the operator of the vehicle. Accordingly, in the opinion of many, any such system to merit adoption would have to include means whereby the power steering mechanism is given priority over the accumulator with respect to the pressure provided by the pump.

The present invention has as its principal object to provide valve means for the purpose just indicated.

Another object is to provide a priority valve which is actuated as determined by the prevailing pressures in the accumulator and in the power steering circuit.

A still further object is to provide a valve of simple design, capable of manufacture at low cost and without special equipment.

The invention will be specifically described in terms of a preferred embodiment thereof illustrated by the accompanying drawings in which:

Figure 1 is an essentially diagrammatic representation of a system of the type to which the invention is applicable;

Figure 2 shows the priority valve in plan;

Figure 3 is a section on the line 3—3 in Figure 2; and

Figure 4 is a fragmentary section taken on the line 4—4 of Figure 2.

Referring first to Figure 1, the numeral 10 indicates a steering column topped by a steering wheel 12 and terminating at its lower end in a power steering gear including a control valve 14, a power cylinder or steering motor 16 confining a piston, not shown, the piston being operably connected to the output member of the reduction gearing housed within the gear box 20. Valve 14 may be assumed as conforming with the valve described in Davis Patent 2,213,271, it being understood, however, that no limitation to such valve is intended. The identified patent may also be referred to for a description of the modus operandi of a power steering gear typical of those in connection with which the invention herein may be used.

In addition to the parts just identified, the system of Figure 1 comprises an accumulator 22 maintained at a predetermined pressure by a pump 24 which may be powered directly by the engine of the vehicle, as through belt and pulley means in the conventional manner.

A fluid motor 26, on manipulation of the valve 28, the control for which may be situated on the dash panel of the vehicle, is adapted to actuate a seat adjusting or windshield wiper mechanism, for instance. The discharge from the motor 26 is returned to the pump 24 via lines 30 and 32, the latter line also receiving via line 30 the exhaust fluid from the power steering mechanism.

It should be understood that the circuit shown may be modified by known methods to include substantially any number of motors (and corresponding control valves) and that the illustration of only one motor in addition to the steering motor 16 is in the interest of simplifying the description.

So as to assure the availability of adequate pressure for the operation of the power steering gear at all times when the engine of the vehicle is running, there is disposed in the circuit between the accumulator 22 and the pump 24 a valve 34, the construction and operation of which will be made clear by reference to Figures 3 and 4.

The valve 34 includes a housing portion 36 suitably bored and counterbored at 38 and 40 so as to receive the fixtures corresponding to the line from the pump and the line to the accumulator, respectively. A third fixture 42 allows for connection of the line to the power steering control valve 14, while a fourth fixture 44 (Fig. 4) corresponds to the exhaust line 45 (Fig. 1) to the pump.

Housing 36 is internally formed to provide annular channels 60, 62, and 63. Channel 60 is open to the bore 38, while channels 62 and 63 are open, respectively, to the bore 40 and the bore receiving the fixture 44.

Confined within the housing 36 in telescopic relation are a pair of plungers 46, 48. The inner plunger 46 has a center bore for the accommodation of a spring 50 backed by a plug 52 threaded into the upper end of the outer plunger 48. Upward movement of the plunger 48 is similarly resisted by a spring 54 which abuts the head of the plug 52 and the upper inner surface of a larger plug 56 threaded into the valve housing 36.

Valve plunger 48 carries at its lower end a plurality of tangs or projections 65 which by engagement with the valve housing limit the extent of the downward movement of the plunger. These tangs extend from a land 67 formed integral with the plunger and comprising a plurality of peripheral grooves 70 paralleling the axis of the plunger. Upward of the land 67, the plunger 48 has therein two pairs of apertures 72, 72a, 74, 74a. A larger aperture 76 and two intersecting bores 78, 80 complete the fabrication of the plunger.

The inner plunger 46 of the valve 34 includes a central land 82 and end lands 84 and 86, the central land fitting within the reduced portion of the outer plunger 48 (Figure 4).

*Operation*

The valve parts are shown in their relative positions obtaining when the accumulator is being loaded by the pump. The fluid flow to the accumulator is around the outer plunger 48. This fluid does not represent the entire output of the pump in view of the peripheral grooves 70 in the land 67 which cause diversion of up to 40–50% of the fluid into the line to the power steering mechanism.

Should the demand on the power steering mechanism increase during the accumulator loading cycle to a point calling for more of the output of the pump, the incident increase in the pressure in the line to the power steering mechanism will cause the upward shifting of first the inner plunger 46 and second the outer plunger 48 so that the entire pump output may go for steering. The upward movement of the inner plunger is against the resistance of the spring 50 only. The outer spool is retained in its position until the chamber 92 is connected to the annular channel 63 through the intersecting bores 78, 80 and by virtue of the upward movement of the inner spool. Upward movement of the outer spool is then against the resistance of the spring 54.

Assuming, however, that no unusual power steering demand occurs during the accumulator loading cycle, then once the accumulator pressure has reached the predetermined value the inner plunger alone will be first shifted upwardly, this movement occuring by reason of the annular reaction surface 90, which is subject to the accumulator pressure—note apertures 72, 72a. Such shifting of the inner plunger is marked initially by the closing off of the apertures 74, 74a in the outer plunger through which the passageway 78, 80 receives fluid from the pump. Accordingly, fluid from the pump is no longer permitted to flow into the chamber 92. The fluid thus locked in this chamber prevents movement of the outer plunger with the inner plunger, until on further increase in the pressure in the accumulator line, the land 86 of the inner plunger has reached a level allowing communication between the passageway 78, 80 and the annular channel 63 which connects with the exhaust line to the pump. When this level is reached, the outer plunger moves with the inner to entirely shut off flow to the accumulator, the fluid in the chamber 92 exhausting through 80, 78, and 63.

As the pressure in the accumulator drops due to the demands of the motor 26, the plungers are restored to their initial positions by the springs 50, 54 and the pressure developing in the chamber 92 to begin another cycle. The loading of the springs, of course, depends on the pressures involved in the particular system.

Having thus described and illustrated our invention what we claim is:

1. In a fluid pressure system comprising a plurality of fluid motors one of which must have fluid pressure available to it at all times, the combination of a valve receiving fluid from a source of fluid pressure and having outlets to a pressure container and to said one of said motors, said valve including a first member movable to control the distribution of fluid as between said outlets, said member being incapable of depriving said one motor of more than a predetermined amount of the output of said source of fluid pressure, and a second movable member through which said first member is controlled, as determined by the pressure prevailing in said pressure container and the pressure in the fluid circuit including said one motor.

2. In a fluid pressure system comprising a plurality of fluid motors one of which must have fluid pressure available to it at all times, the combination of a valve, receiving fluid from a pump included in the system, and having outlets to an accumulator and to said one of said motors, said valve including a first member movable to control the distribution of fluid as between said outlets, said member being incapable of depriving said one motor of more than a predetermined amount of the output of said pump, and a second movable member in telescopic relation with said first member through which said first member is controlled as determined by the accumulator pressure and the pressure in the circuit including said one motor.

3. In a fluid pressure system comprising a plurality of fluid motors one of which must have fluid pressure available to it at all times, the combination of a valve, receiving fluid from a pump included in the system, and having outlets to an accumulator and to said one of said motors, said valve including a first spring-loaded member movable to control the distribution of fluid as between said outlets, said member being incapable of depriving said one motor of more than a predetermined amount of the output of said pump, and a second spring-loaded member disposed telescopically within said first member and movable to control the latter as determined by the accumulator pressure and the pressure in the circuit including said one motor.

4. In a fluid pressure system comprising a plurality of fluid motors one of which must have fluid pressure available to it at all times, the combination of a valve, receiving fluid from a pump included in the system, and having outlets to an accumulator and to said one of said motors, said valve including a housing portion formed to provide said outlets and a pair of telescopically related spring-loaded members within said housing, the outer of said members being movable to control the distribution of fluid between said outlets and being incapable of depriving said one motor of more than a predetermined amount of the output of said pump, the inner of said members serving to control said outer member as determined by the accumulator pressure and the pressure in the circuit including said one motor.

5. In an automotive vehicle, a fluid pressure system comprising a plurality of fluid motors one of which is operatively connected to a steering part, a valve receiving fluid from a pump carried by the vehicle, and having outlets to an accumulator and to said one motor, said valve including a housing portion formed to provide said outlets and a pair of telescopically related spring-loaded members within said housing, the outer of said members being movable to control the distribution of fluid between said outlets and being incapable of depriving said one motor of more than a predetermined amount of the output of said pump, the inner of said members serving to control said outer member as determined by the accumulator pressure and the pressure in the circuit including said one motor.

6. In a fluid pressure system comprising a plurality of fluid motors one of which must have fluid pressure available to it at all times, the combination of a valve, receiving fluid from a pump included in a system, and having outlets to an accumulator and to said one of said motors, said valve including a first member loaded by a spring at one end thereof and movable to control the distribution of fluid as between said outlets, said member being incapable of depriving said one motor of more than a predetermined amount of the output of said pump, a second spring-loaded member disposed telescopically within said first member and movable to control the latter as determined by the accumulator pressure and the pressure in the circuit including said one motor, and means providing a chamber at the spring end of said first member, said chamber being in open communication with said pump in one position of said first member whereby fluid pressure developing therein acts in aid of the spring.

7. In an automotive vehicle, a fluid pressure system comprising a plurality of fluid motors one of which is operably connected to a steering part, a valve, receiving fluid from a pump carried by the vehicle, and having outlets to an accumulator and to said steering motor, said valve including a first member loaded by a spring at one end thereof and movable to control the distribution of fluid as between said outlets, said member being incapable of depriving said steering motor of more than a predetermined amount of the output of said pump, a second spring-loaded member disposed telescopically within said first member and movable to control the latter as determined by the accumulator pressure and the pressure in the circuit including said steering motor, and means providing a chamber at the spring end of said first member, said chamber being in open communication with said pump in one position of said first member whereby fluid pressure developing therein acts in aid of the spring.

References Cited in the file of this patent

UNITED STATES PATENTS

| | | |
|---|---|---|
| 2,213,271 | Davis | Sept. 3, 1940 |
| 2,462,983 | MacDuff et al. | Mar. 1, 1949 |
| 2,674,092 | Gardiner | Apr. 6, 1954 |
| 2,708,344 | Greer | May 17, 1955 |
| 2,737,196 | Eames | Mar. 6, 1956 |

FOREIGN PATENTS

| | | |
|---|---|---|
| 627,595 | Great Britain | Aug. 11, 1949 |